United States Patent Office 3,539,659
Patented Nov. 10, 1970

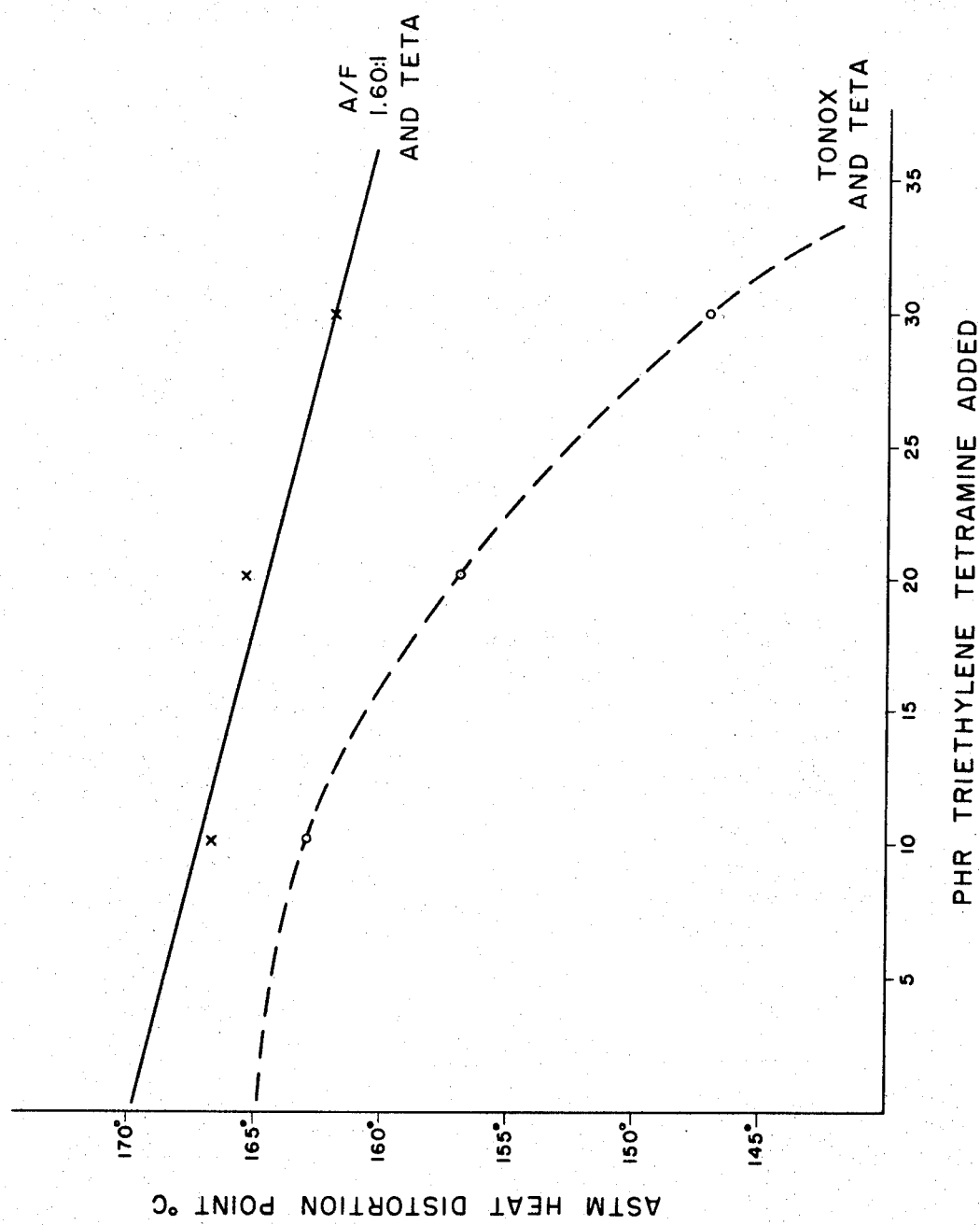

3,539,659
LIQUID AMINE CURING AGENTS FOR POLYEPOXIDES
Ronald Lee DeHoff, Maplewood, N.J., assignor to R. T. Vanderbilt Company, Inc., New York, N.Y., a corporation of New York
Filed Nov. 22, 1967, Ser. No. 685,077
Int. Cl. C08g 45/10
U.S. Cl. 260—834  8 Claims

ABSTRACT OF THE DISCLOSURE

A curing agent for polyepoxides is provided in the form of a condensaate formed by combining aniline and formaldehyde in a molar ratio within the range of 1.60:1 to 1.70:1 respectively. A preferred curing agent is made by combining the condensaate with a reactive liquid amine diluent, such as trimethyl dihydroquinoline, triethylene tetramine or paramenthane diamine.

---

This invention relates to improved liquid aromatic amine curing agents for polyepoxides. In particular, it relates to liquid aniline-formaldehyde condensates as curing agents for polyepoxides.

Hardenable polyepoxides comprise a wide range of compounds containing more than one epoxide group per molecule and include glycidyl polyethers, glycidyl polyesters and polyglycidyl derivatives of aromatic amines. These compounds generally require a catalyst, curing agent or heat to convert them into infusible resins.

Aromatic polyamides are highly satisfactory curing agents for polyepoxides because they impart excellent high temperature properties to the cured resin. When they are added to liquid polyepoxides at a low temperature, the resulting mixtures react slowly and maintain a usable low viscosity even when large masses are prepared. Generally speaking, such mixtures can be held for over four hours before gelation or exothermic reaction occurs. Most aromatic polyamines are solid at room temperature.

The use of solid curing agents with viscous polyepoxides entails a number of difficulties. Unless close contact is maintained between all parts of the polyepoxide and the curing agent, there will be pockets of uncured polyepoxide in the cured resin, giving as a consequence a product of poor physical and electrical properties. If heat is required to melt the curing agent, the pot life of the mixture is considerably shortened. If solvents for the curing agent are used, bubbles may form which tend to weaken the structure of the resin. If a monoepoxide is used as a diluent, there are fewer crosslinks with the polyepoxide and a cured resin having lower heat distortion values results.

This problem has been partially solved in the past by use of low-melting eutectics of m-phenylenediamine and p,p'-diaminodiphenyl methane. Such mixtures have been stabilized by reaction with a minor amount of a monoepoxide to further reduce the melting point. Both such combinations are merely supercooled liquids which crystallize at low temperatures, around 10° C. It is necessary to warm these mixtures to about 65° C. with thorough mixing if optimum properties are to be obtained from their use.

It is obvious that a liquid aromatic polyamide which is stable at temperatures as low as −40° F., a temperature which is encountered in various parts of the country, would be extremely advantageous as a curing agent for polyopexides. By "stable" is meant that the curing agent does not crystallize at these temperatures. Such a curing agent could be incorporated readily into a polyepoxide to form a clear, homogeneous liquid mixture. Such a mixture also has a relatively long pot life since no heat is required to incorporate the curing agent into the system as is necessary when aromatic polyamines or their eutectic mixtures are used.

It is, accordingly, an object of this invention to provide a liquid aromatic polyamine curing agent for polyepoxides which is stable to crystallizataion at temperatures as low as −40° F. Another object is to provide an aromatic polyamine curing agent which produces cured polyepoxide resins having higher heat distortion points and properties superior to those obtained from presently available aromatic polyamines or their eutectic mixtures. Still another object is to provide a non-crystallizing mixture of an aniline-formaldehyde condensate and a reactive amine.

It has now been found that aniline-formaldehyde condensates prepared by combining aniline and formaldehyde under acid conditions in a molar ratio of 1.60:1 to 1.70:1, respectively, are liquids and that their use as curing agents for polyepoxides produces cured epoxy resins having improved properties. It has further been found that mixtures of these liquid condensates with reactive liquid amine diluents have a number of important advantages as curing agents over prior art liquid curing agents.

The use of p,p'-diaminodiphenyl methane, the product of reaction of 2 moles of aniline with 1 mole of formaldehyde under acid conditions, is well known in the art. Aniline-formaldehyde resins prepared from different proportions of these reactants have also been used as epoxy resin curing agents. Solid condensates made from aniline-formaldehyde mixtures in ratios of 2:1 to 1.33:1 are disclosed in U.S. Pat. No. 2,881,149, and similar condensates made with ratios of 1.33:1 to 1:1 were reported by Bishop, J. Appl. Chem. 6, 256–60 (1956). According to the reference, resin with a ratio of 1.33:1 was semi-solid at room temperature and the resin with a ratio of 1.17:1.0 melted at 50–60° C.; both of these resins had to be heated to 100–120° C. to melt them sufficiently to blend with melted polyepoxide.

The condensates of this invention, on the other hand, are liquid and provide a longer pot life. Furthermore, the condensates of this invention produce epoxy resins having heat distortion properties superior to any of aromatic amine type presently available on the market and are non-staining.

The aniline-formaldehyde liquid resins of this invention are thought to contain a substantial number of secondary amino hydrogen atoms and to correspond to the structure:

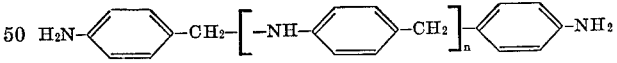

where $n$ approaches 1. This belief is based on the stoichiometry of its reaction with epoxide groups. A typical compound is prepared by slowly adding at room temperature 1.00 mole of formaldehyde (as 37% aqueous solution) to 1.59 moles of aniline. When addition is complete, the mixture is heated to 95° C. and held for two hours. The reaction mixture is neutralized with sodium hydroxide before the condensate is recovered.

The polyepoxides which can be cured by the aniline-formaldehyde resin of the invention include the products resulting from the reaction of polyhydric phenols or polyhydric alcohols with an epihalohydrin or with glycerol dihalohydrin in the presence of a sufficient quantity of caustic alkali to dehydrohalogenate the addition product. In general, the products are monomeric or straight chain polymeric products containing more than one epoxide group or having a 1,2-epoxy equivalent of more than one, and they may range from hard solids to liquids having melting points below 30° C. The more useful type for use with the liquid curing agents of the invention are the liquid monomeric glycidyl polyethers of polyhydric phenols with an epoxy equivalent weight up to 300 grams. An example of the preferred type of polyepoxide is Epon 826 of Shell Chemical Company, a glycidyl polyether of bisphenol A, having a weight per epoxide (WPE) of 185 grams. Bisphenol A is 2,2-bis(4-hydroxyphenyl) propane.

Other polyepoxides which the novel curing agent of this invention may usefully cure include the glycidyl ethers of novolac resins derived from polyhydric phenols by condensation with an aldehyde, followed by reaction with epichlorohydrin in presence of alkali to produce a viscous liquid glycidyl ether with a WPE of about 175 grams. A typical epoxidized novolac resin is DEN 438 of Dow Chemical Company.

Other useful polyepoxides include epoxidized esters of polymerized fatty acids, such as Epon 871 of Shell Chemical Company, and the diglycidyl anilines, such as Epotuf Resin STF-5 of the Reichhold Chemicals Company.

As discussed above, a preferred embodiment of this invention is a solution of the aniline-formaldehyde condensates having a ratio within the range of 1.60:1 to 1.70:1 with a liquid reactive amine diluent. The condensates may be combined with the diluents in all proportions to provide a curing agent which will not crystallize on standing. From 1 to 50% of diluent, based on the weight of the combined amine diluent and condensate, is preferred. An amount of diluent in excess of 50% generally reduces the heat resistance of the resulting cured resin.

While aniline-formaldehyde condensates made according to the present invention are viscous liquids if prepared to have an aniline-formaldehyde ratio in the range of 1.44:1 to 1.7:1, those with a ratio below 1.6 are extremely viscous even when heated to 100° C. Further, when the condensate having a ratio below 1.6 to 1 is blended with reactive polyfunctional amine diluents, the blend remains too viscous to use, regardless of the properties of blending agent. On the other hand, aniline-formaldehyde condensates of ratio higher than 1.7:1 will crystallize when allowed to stand for a relatively short time, and when blended with polyfunctional amines, they tend to crystallize on standing. The 1.60 to 1 ratio remains liquid for at least a year when blended with from 10 to 100 parts per hundred of amine, even at sub-zero temperatures.

While the products obtained at aniline to formaldehyde ratios between 1.70:1 and 1.60:1 may be liquids, they may be somewhat more viscous than desirable for mixing with liquid polyepoxides at room temperature. Hence it is advantageous to lower their viscosity by blending polyfunctional liquid aliphatic amines with them. It has been found that stable, non-crystallizing blends are obtained when condensates prepared with ingredients present at the 1.70:1 to 1.60:1 range of ratios are blended with liquid aliphatic polyamines such as diethylene triamine, triethylene tetramine, tetraethylene pentamine etc.; with hydroxyalkylamines such as monoethanolamine, diethanolamine, triethanolamine, aminomethyl propanol, and aminoethyl propanediol; with alicyclic amines such as monoethylpiperazine and diaminomenthane; and with the quinolines, such as trimethyl dihydroquinoline. Small amounts of the aromatic diamines such as ortho-, meta-, and para-phenylenediamines may be blended and used if desired.

It has been found that when minor amounts of such amines are blended with the aniline-formaldehyde condensate, those of ratio greater than 1.70:1 crystallized out after standing for a few days to six months at room temperature. Blends with those of ratio below 1.60:1, namely 1.44:1, were excessively viscous even with major proportions of the diluent.

The following examples further illustrate the curing agents of this invention and their use in preparing cured epoxy resins.

EXAMPLE 1

Aniline-formaldehyde condensates were prepared under identical conditions, the only variation being the molar ratio of aniline to formaldehyde. The ratios were varied between the limits of 1 to 2 moles of aniline per 1 mole of formaldehyde. Excess aniline was stripped from the product, so the ratio of ingredients used does not exactly reflect the ratio of aniline to formaldehyde found in the final products.

In one run, 1.67 moles of aniline and 8.6 moles of water, were placed in an agitated reactor. Concentrated hydrochloric acid, 1.69 moles, was slowly added. The solution was cooled to 30° C. and formaldehyde (37% solution), 1.11 moles, was slowly added with agitation. When addition was complete, the mix was heated to 95° C. for two hours. The acid was then neutralized with 1.75 moles of 50% aqueous NaOH solution. Agitation was stopped and the aqueous layer removed. The product was then washed with water, and the organic layer separated and stripped to remove water and excess aniline, cooled, and weighed up.

The above procedure was repeated, substituting ratios of aniline to formaldehyde given in the table shown in Example 2 below, where it is shown that aniline-formaldehyde products of ratios between 1.3:1 and 1.8:1 are viscous liquids, while those above and below this range are solids at room temperature.

EXAMPLE 2

Samples of aniline-formaldehyde condensate prepared above included nine involving different aniline to formaldehyde ratios. These materials were first tested by placing in an oven at 70° C. and held for four hours; solids which did not melt at that temperature were placed in an oven at 100° C. and held for four hours longer. The physical properties of each condensate are given below, together with the aniline-formaldehyde ratio of each:

| Sample: | A-F ratio | Room temp. | 70° C. | 100° C. |
|---|---|---|---|---|
| 24 | 1:1 | Solid | | |
| 34 | 1.2:1 | do | | |
| 33 | 1.3:1 | Clear viscous liquid | Highly viscous liquid | Medium viscosity liquid. |
| 23 | 1.44:1 | do | Highly viscous | |
| 28 | 1.6:1 | do | Low viscosity liquid | |
| 29 | 1.7:1 | do | do | |
| 30 | 1.8:1 | Viscous liquid with crystals present | do | |
| 31 | 1.9:1 | Solid | Solid | Low viscosity liquid. |
| 32 | 2.0:1 | do | do | Do. |

As a result of the heat treatment given the product, sample 33, when cooled to room temperature, changed from a viscous liquid to a clear brittle reddish amber solid melting at about 90° C. This unstable product is unsuitable for commercial uses. All of the other products returned to their original state on cooling. Samples 34 and 24, with ratios below 1.26:1, were solids at elevated temperatures and were not evaluated in the tests which follow because they gelled epoxy resin prematurely when blended with it at high temperatures; these had an extremely short pot life.

In order to evaluate the various liquid condensates as curing agents, the heat distortion points and elevated temperature resistance of the cured epoxy polymers made therefrom were chosen as criteria. The polyepoxide used in these tests was a moderately purified glycidyl polyether of bisphenol A, Shell's Epon 826.

EXAMPLE 3

Separate 100-gram portions of a polyglycidyl ether of bisphenol A having a WPE of 185 grams were placed in 1-pint cans, heated to 90° C., and each was blended with one of the experimental aniline-formaldehyde condensates of Example 2 in the amounts shown in the table below. The amount in each case was determined by calculating the average number of repeating units, $n$, in the structural formula given above in the specification, from the equation:

$$A-F\ \text{ratio} = \frac{n+2}{n+1}$$

In this manner, the amount of curing agent which will react with one WPE of polyepoxide can be calculated, as can the amount which will react with 100 grams of the polyepoxide. For instance, in the case where the ratio A–F=1.6, substituting in the equation, one obtains:

$$1.6 = \frac{n+2}{n+1}$$
$$1.6n + 1.6 = n + 2$$
$$0.6n = 0.4$$
$$n = 0.67$$

In the formula, then, there will be an average of 0.67 repeating —NH—$C_6H_4$—$CH_2$— units of formula weight 105, and containing 0.67 amino hydrogens, while the end units containing 4 amino hydrogens have a formula weight of 198. The average molecular weight is then $(0.67 \times 105) + 198 = 268.4$, and the weight of this material which will contain one hydrogen (to react with one epoxy) is $$\frac{268.4}{4.67} = 57.0\ \text{grams}$$

The amount of the polyglycidyl ether of bisphenol A molecular weight of epoxide is 185 grams. The amount of aniline-formaldehyde which will react with a 100-gram portion of the polyepoxide, by proportion is:

$$185:100::57:x$$
$$x = 30.8\ \text{grams}$$

This is the amount of A–F used in the curing tests to obtain maximum heat distortion values or maximum cure.

The A–F condensates were preheated to 90° C. and stirred into the resin for two minutes with a high speed mechanical stirrer. Each blend was then poured into heat distortion bar molds ½ x ½ x 5 inches in size. All samples were cured for 1.5 hours at 90° C. and for three hours longer at 150° C. in a circulating hot air oven.

Heat distortion temperature: Heat distortion temperatures were determined according to ASTM D648–56; the results are tabulated below:

| | A–F ratio | Concn. of curing agent, phr.[1] | Heat distortion temperature,° C. | Gel time at 90° C., minutes |
|---|---|---|---|---|
| Sample: | | | | |
| 23 | 1.44:1 | 34.0 | 169.0 | 80 |
| 28 | 1.6:1 | 31.0 | 168.0 | 80 |
| 29 | 1.7:1 | 30.0 | 168.0 | 80 |
| 30 | 1.8:1 | 28.0 | 165.5 | 80 |
| 31 | 1.9:1 | 28.0 | 164.5 | 80 |
| 32 | 2.0:1 | 27.0 | 162.5 | 60 |

[1] Phr. denotes parts of additive per hundred parts of resin.

High temperature resistance: The heat distortion bars prepared and evaluated as described above were cleaned to remove any oil, weighed on an analytical balance, then placed in a circulating air oven for 53 hours at 200° C., allowed to cool to room temperature (ambient humidity), reweighed, and their heat distortion temperatures remeasured. The loss in weight of each bar, together with a comparison of heat distortion temperatures before and after heating at 200° C. are summarized below:

| | | | Heat distortion Temperature,° C. | |
|---|---|---|---|---|
| | A–F ratio | Weight loss at 200° C., percent | Original | After heating at 200° C. |
| Sample: | | | | |
| 23 | 1.5:1 | 1.03 | 169 | 161.5 |
| 28 | 1.6:1 | 0.66 | 168 | 172 |
| 29 | 1.7:1 | 0.55 | 168 | 168 |
| 30 | 1.8:1 | 0.35 | 165.5 | 168 |

A weight loss and loss in heat distortion properties of sample 23 are considered excessive.

EXAMPLE 4

As an example of the effect of amines blended with aniline-formaldehyde condensates, separate 100-gram portions of the aniline-formaldehyde condensates tabulated were blended with 30 grams of triethylene tetramine. As a control, a 100-gram portion of a commercial aniline-formaldehyde condensate containing as its chief constituent p,p'-diaminodiphenylmethane (Tonox of Naugatuck Chemical Division, United States Rubber Company), a solid, was melted at 90° C. and blended with 30 grams of triethylene tetramine. The composition thus prepared was held at room temperature and observed for time of appearance of crystals, or for twelve months. The stability toward crystallization of the various blends is summarized below:

| | Stability toward crystallization at room temperature |
|---|---|
| A-F ratio: | |
| 1.5:1 | Stable after 12 months. |
| 1.6:1 | Do. |
| 1.7:1 | Crystallized after 6 months. |
| 1.8:1 | Crystallized in 2 months. |
| 1.9:1 | Crystallized in 3 days. |
| 2.0:1 | Crystallized in 1 day. |
| Tonox 2.0:1 | Crystallized in 7 days. |

In addition to the desirable properties of fluidity at room temperature and complete compatibility and stability when mixed with various amines, the liquid aniline-formaldehyde condensates of the invention cure polyepoxides to resins having higher heat distortion points and better chemical resistance than is possible with (a) the p(p'-diaminodiphenylmethane, which has a 2:1 A–F ratio, (b) with a commercial 1:1 ratio by weight m-phenylenediamine and p,p'-diaminodiphenylmethane eutectic, (c) with solid aromatic amines such as m-phenylenediamine, or (d) a liquid alicyclic such as p-menthane diamine.

EXAMPLE 5

The liquid curing agent compositions of this invention show considerable improvement over prior art compositions. The aniline-formaldehyde condensate of this invention is only slightly affected in its cross-linking properties as compared with Tonox a well known commercial curing agent when each is diluted with amine or solvent and the compositions of this invention thus provide cross-linked polymers with higher heat distortion points, better physical properties and better chemical resistance.

Furthermore, at low levels of the amine or solvent, the TONOX crystallizes, indicating that it is insufficiently resinous in nature to be stable. Because it is a predominantly crystalline solid, the commercial material requires a certain minimum amount of solids to be stable; at least 30 phr. in TETA and 20 phr. in DMF are apparently required. The aniline-formaldehyde condensates of this invention, however, can be diluted with amines, solvents, or mixtures thereof, in all proportions without crystallization.

To separate 100-gram portions of aniline-formaldehyde condensate in 1.6:1 ratio and of commercial p,p'-diaminodiphenylmethane curing agent were added 0, 10, 20 and 30 grams of the amine diluent, triethylene tetramine (TETA) and 10 and 20 parts of dimethylformamide (DMF). Portions of the resulting compositions were observed for crystal formation after one week, one month, and one year. Stoichiometrical proportions of each were used to cure 100-gram portions of the glycidyl polyether of Example 3 according to the method of Example 3, and heat distortion temperatures were also determined according to Example 3.

The following results were obtained.

| Curing agent | Additive Name | Phr. | HDT, °C. | Solution stability |
|---|---|---|---|---|
| Aniline-formaldehyde condensate, 1.6=1 | None | | 170.0 | |
| | TETA | 10 | 168.0 | No crystals after 1 yr. |
| | TETA | 20 | 164.5 | Do. |
| | TETA | 30 | 162.0 | Do. |
| | DMF | 10 | 147.5 | Do. |
| | DMF | 20 | 127.5 | Do. |
| Commercial p,p'-diaminodiphenylmethane | None | | 165.0 | |
| | TETA | 10 | 163.0 | Crystals in 1 wk. |
| | TETA | 20 | 157.0 | Do. |
| | TETA | 30 | 147.5 | Crystals in 1 mo. |
| | DMF | 10 | 133.0 | Crystals in 1 wk. |
| | DMF | 20 | 118.0 | Crystals in 1 mo. |

These results show that, unlike commercial p,p'-diaminodiphenylmethane curing agent, the anilineformaldehyde curing agent of the invention can be cut with solvents for the purpose of lowering viscosity to practical levels without danger of causing crystallization or solidification of the curing agent, and use of reactive amine diluents decreases heat distortion less drastically than do inert diluents. Diluents have a more deleterious effect on p,p'-diaminodiphenylmethane cures than on the A–F condensate cures.

The heat distortion data for the compositions containing triethylene tetramine are plotted in the curves in the drawing submitted herewith. It is clear from a consideration of the drawing that the resin cured with anilineformaldehyde condensate of molar ratio of 1.60 to 1 is only slightly affected in its cross-linked properties with increasing quantities of triethylene tetramine, as compared to Tonox.

EXAMPLE 6

When two curing agents are blended, it is expected that the properties of a resin cured by such a blend will be the sum of the effects on such properties contributed by each component of the blend in proportion to the amount of each present, or an additive effect. Surprisingly, it has been found that blends of the anilineformaldehyde curing agent of the invention with the reactive polyfunctional amine, triethylenetetramine (TETA) produce cured resins having heat distortion properties higher than expected on the additive basis, while those of resins cured by a blend of p,p'-diaminodiphenylmethane with TETA are lower than expected on the additive basis. This difference in effect was shown by the following:

To separate portions of the glycidyl polyepoxide described in Example 3 were added stoichiometric amounts of triethylenetetramine (TETA), the aniline-formaldehyde curing agent of the invention, p,p'-diaminodiphenylmethane, and the following blends expressed in parts by weight: aniline-formaldehyde 80/TETA 20, aniline-formaldehyde 70/TETA 30, p,p'-diaminodiphenylmethane (Tonox) 80/TETA 20, and Tonox 70, TETA 30. After thorough mixing of each, the resulting compositions were cured and tested according to the methods of Example 3, the heat distortion temperatures observed are presented below in comparison with those calculated on the basis of additive effect of the components of each of the blends.

| Curing agent | Heat distortion temperature | |
|---|---|---|
| | Observed, °C. | Calculated °C. |
| Triethylenetetramine (TETA) | 110 | |
| Aniline-formaldehyde (1.6:1) | 170 | |
| 20 phr. TETA (16.6%) | 165 | 160 |
| 30 phr. TETA (23%) | 162 | 156 |
| p,p'-diaminodiphenylmethane | 165 | |
| 20 phr. TETA (16.6%) | 147.5 | 156 |
| 30 phr. TETA (23%) | 138 | 152 |

Thus it is shown that whereas p,p'-diaminodiphenylmethane blended with TETA produced cured resins having lower heat distortion temperatures than those calculated on the basis of the composition of the blends, those produced by aniline-formaldehyde curing agent of the invention had heat distortion temperatures considerably enhanced over those expected on the additive basis.

EXAMPLE 7 p-Menthanediamine is a liquid primary diamine which can be used as a diluent for aniline-formaldehyde condensates. In a preliminary experiment, the effect of a 1:1 dilution, or 100 phr., of A–F condensates of varying A–F ratios with p-menthanediamine upon viscosity was determined and was found to reach practical levels in the claimed A–F range.

In order to reduce the viscosities of the aniline-formaldehyde condensates of the invention to measurable level, a 50-gram portion of each was warmed and blended with a 50-gram portion of p-menthanediamine. The blends were cooled in a constant temperature room at 77°±2° F. and placed in Gardner-Holdt Viscosity tubes. Viscosities were determined by comparison with Standard Gardner Bubble Viscometer Tubes meeting the requirements of ASTM Specification D154–56 and of Federal Test Method Standard No. 141, Method 427.1. The approximate kinematic viscosity in stokes was converted to centipoises by multiplying by specific gravity (1.10) and by 100, to give the following:

| | | Viscosity | |
|---|---|---|---|
| | A–F ratio | Gardner tube | Centipoises |
| Sample No.: | | | |
| 1 | 1.2:1 | >$Z_6$ | >17,600 |
| 2 | 1.44:1 | Y–Z | 2,000–2,600 |
| 3 | 1.6:1 | V–W | 1,020–1,220 |
| 4 | 1.7:1 | T–U | 630–720 |
| 5 | 1.9:1 | T–U | 630–720 |
| 6 | 2.0:1 | M–N | 370–390 |

Pourable liquids of viscosities of about 1500 cps. and lower were attained with A–F ratios of 1.6:1 and higher.

EXAMPLE 8

Trimethyldihydroquinoline in monomeric form may be blended with the aniline-formaldehyde curing agent of the invention to provide acceptable viscosity and pot life.

Separate 100-gram portions of aniline-formaldehyde condensate of 1.7:1 ratio were blended with 0, 10, 20, and 30-gram portions of 2,2,4-trimethyl-1,2-dihydroquinoline and the resulting liquid blends used in sufficient amount to provide maximum cure of 100-gram portions of the glycidyl polyepoxide described in Example 3. Portions of each of the resulting compositions were poured into heat distortion bar molds, cured for two hours at 85° C. followed by three hours at 150° C., and heat distortion temperatures determined according to the method of Example 3. The results follow.

| Trimethyldihydroquinoline phr. | Heat distortion temperature, ° C. |
| --- | --- |
| 0 | 170.0 |
| 10 | 161.5 |
| 20 | 143.5 |
| 30 | 122.0 |

At the 30 phr. diluent level, viscosity was reduced to about one-tenth that of the undiluted curing agent. Trimethyldihydroquinoline provides a long pot life without decreasing speed of cure at elevated temperatures, though it does affect heat distortion properties.

I claim:
1. A resin composition hardenable by heat and pressure comprising a polyepoxide and about stoichiometrical proportions of a liquid curing agent consisting essentially of about 1 to 50% of a reactive amine diluent as a first compound and about 50% to 99% of a liquid condensate of aniline and formaldehyde as a second and different compound based on the weight of the combined reactive amine diluent and condensate, said condensate being formed by combining aniline and formaldehyde in a molar ratio within the range of 1.60:1 to 1.70:1.
2. The composition according to claim 1 in which the reactive amine diluent is selected from the group consisting of aliphatic polyamines, hydroxyalkylamines, alicyclic amines, aromatic diamines and quinolines.
3. A resin composition hardenable by heat and pressure comprising a polyepoxide and about stoichiometrical proportions of a liquid curing agent consisting essentially of about 1 to 50% of a reactive amine diluent as a first compound and about 50% to 99% of a liquid condensate of aniline and formaldehyde as a second and different compound based on the weight of the combined reactive amine diluent and condensate; said condensate being formed by combining aniline and formaldehyde in a molar ratio within the range of 1.60:1 to 1.70:1; said reactive amine diluent being an aliphatic polyamine.
4. The composition according to claim 3 in which the aliphatic polyamine is triethylene tetramine.
5. A method for curing a polyepoxide which comprises reacting the resin at elevated temperatures with about stoichiometrical proportions of a liquid curing agent consisting essentially of about 1 to 50% of a reactive amine diluent as a first compound and about 50% to 99% of a liquid condensate of aniline and formaldehyde as a second and different compound based on the weight of the combined reactive amine diluent and condensate; said condensate being formed by combining aniline and formaldehyde in a molar ratio within the range of 1.60:1 to 1.70:1.
6. The method according to claim 5 in which the reactive amine diluent is selected from the group consisting of aliphatic polyamines, hydroxyalkylamines, alicyclic amines, aromatic diamines and quinolines.
7. A method for curing a polyepoxide which comprises reacting the resin at elevated temperatures with about stoichiometrical proportions of a liquid curing agent consisting essentially of about 1 to 50% of a reactive amine diluent as a first compound and about 50% to 99% of a liquid condensate of aniline and formaldehyde as a second and different compound based on the weight of the combined reactive amine diluent and condensate; said condensate being formed by combining aniline and formaldehyde in a molar ration within the range of 1.60:1 to 1.70:1; said reactive amine diluent being an aliphatic polyamine.
8. The method according to claim 7 in which the aliphatic polyamine is triethylene tetramine.

References Cited

UNITED STATES PATENTS

| 2,511,913 | 6/1950 | Greenlee | 260—834 |
| 2,881,149 | 4/1959 | Neut | 260—834 |
| 3,014,007 | 12/1961 | King | 260—834 |
| 3,071,559 | 1/1963 | Smith | 260—834 |
| 3,207,813 | 9/1965 | Harvey | 260—834 |
| 3,310,602 | 3/1967 | Lemon | 260—834 |
| 3,315,010 | 4/1967 | Graham | 260—834 |

FOREIGN PATENTS

| 882,016 | 11/1961 | Great Britain. |
| 1,150,807 | 6/1963 | Germany. |
| 1,038,752 | 9/1958 | Germany. |
| 1,041,244 | 10/1958 | Germany. |

OTHER REFERENCES

Handbook of Epoxy Resins; Lee et al., McGraw-Hill Book Co., New York 1967 (Publication date, Mar. 21, 1967), pp. 7–9, 7–11.

The use of aniline-formaldehyde resins as curing agents for epoxide resins, R. Bishop, J. Appl. Chemistry, June 6, 1956, pp. 256–260.

PAUL LIEBERMAN, Primary Examiner

U.S. Cl. X.R.

260—47, 72.5